Sept. 12, 1961    H. NERWIN ET AL    2,999,439
AUTOMATIC EXPOSURE CONTROL FOR PHOTOGRAPHIC CAMERA
Filed Dec. 5, 1958    4 Sheets-Sheet 1

Hubert Nerwin
John H. Eagle
R. Frank Smith
INVENTORS
BY Robert W. Hampton
ATTORNEYS Sept. 12, 1961 H. NERWIN ET AL 2,999,439
AUTOMATIC EXPOSURE CONTROL FOR PHOTOGRAPHIC CAMERA
Filed Dec. 5, 1958 4 Sheets-Sheet 2
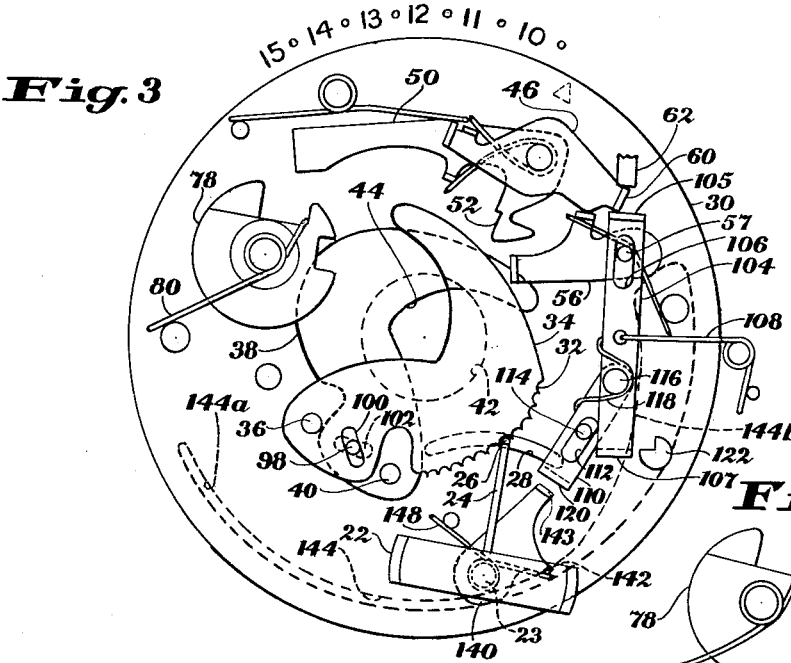
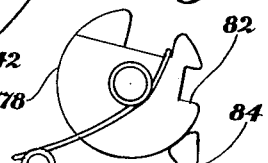
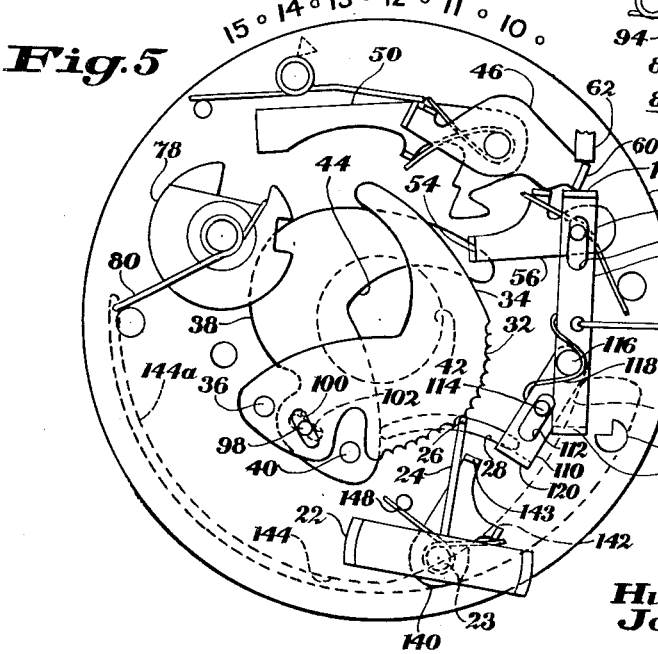
Hubert Nerwin
John H. Eagle
INVENTORS
BY R. Frank Smith
Robert W. Hampton
ATTORNEYS Sept. 12, 1961  H. NERWIN ET AL  2,999,439
AUTOMATIC EXPOSURE CONTROL FOR PHOTOGRAPHIC CAMERA
Filed Dec. 5, 1958  4 Sheets-Sheet 3

Hubert Nerwin
John H. Eagle
INVENTORS

BY R. Frank Smith
Robert W. Hampton
ATTORNEYS

Sept. 12, 1961 H. NERWIN ET AL 2,999,439
AUTOMATIC EXPOSURE CONTROL FOR PHOTOGRAPHIC CAMERA
Filed Dec. 5, 1958 4 Sheets-Sheet 4

Hubert Nerwin
John H. Eagle
INVENTORS

BY R. Frank Smith
Robert W. Hampton
ATTORNEYS

United States Patent Office 2,999,439
Patented Sept. 12, 1961

2,999,439
AUTOMATIC EXPOSURE CONTROL FOR PHOTOGRAPHIC CAMERA
Hubert Nerwin and John H. Eagle, Rochester, N.Y., assignors to Eastman Kodak Company, Rochester, N.Y., a corporation of New Jersey
Filed Dec. 5, 1958, Ser. No. 778,430
6 Claims. (Cl. 95—10)

The present invention concerns photographic cameras and more particularly concerns automatic exposure control systems for such cameras.

In prior art cameras having automatic exposure control systems, either a shutter mechanism or a separate diaphragm mechanism is automatically controlled in accordance with the intensity of light from a viewed scene or object. It has been found that a significant economy of machine parts can be achieved by employing a single mechanism as both the shutter and diaphragm in a camera of this type.

It is therefore a primary object of the present invention to employ a single capping device as both a shutter and a diaphragm in a camera having automatic exposure control. This object may be realized in numerous structures. For example, a single capping device such as a pivoted blade may cooperate with a fixed lens aperture of a camera to normally exclude all light from that aperture and may be moved at a predetermined speed so as to temporarily expose a portion of the aperture to light from the viewed scene. In this case the exposed area of the aperture is determined as a function of the light intensity. Alternatively, the fixed aperture may be fully uncovered during each cyclic movement of the capping device and the rate of that movement may be determined as a function of the light intensity. Instead of a single blade the capping device may comprise two or more blades moving pivotally, linearly or otherwise in a complementary manner.

In order to illustrate the invention we have shown it in the accompanying drawings in a preferred embodiment wherein a pair of pivoted blades constitutes the capping device, with a fixed-speed shutter that moves the blades cyclically to temporarily form a diaphragm aperture between them. The area of the aperture is determined as a function of the light intensity; the extent of opening of the blades is limited by a member that is positioned in response to differential energization of a light-measuring instrument.

When the intensity of the viewed light is below the normal exposure range of the camera, as the latter is adjusted for a particular film speed, filter, etc., it is convenient to have an indication that the automatic exposure control system cannot produce a normal exposure. It is therefore a further object of the invention to indicate the absence of sufficient light for taking a normal exposure with a particular camera adjustment.

More particularly, it is an object to positively block operation of the camera operating lever when there is insufficient light to take a normal exposure of the viewed scene.

A related object is to selectively and momentarily disable a device which, when enabled, blocks operation of the camera operating lever if there is insufficient light to take a normal exposure.

A further object is to disable such blocking device for an indefinite period of time, primarily for taking indoor pictures with flash lighting.

Another object is to manually override the automatic exposure control of a camera for selectively setting an exposure factor that normally is set automatically.

A further object is to selectively enable or disable such manual override, regardless of the manually set value of any exposure factor.

Other objects of the invention will appear from the following description, reference being made to the accompanying drawings, wherein:

FIG. 3 is a front view of the shutter-diaphragm blades showing their manner of cooperation with the galvanometer and the low-light block and manual override mechanisms;

FIG. 4 is a front view of the split shutter-drive lever;

FIG. 5 is a front view of a portion of the mechanism shown in FIG. 3, with the manual override mechanism in its manual position;

Exposure system

Figure 1:
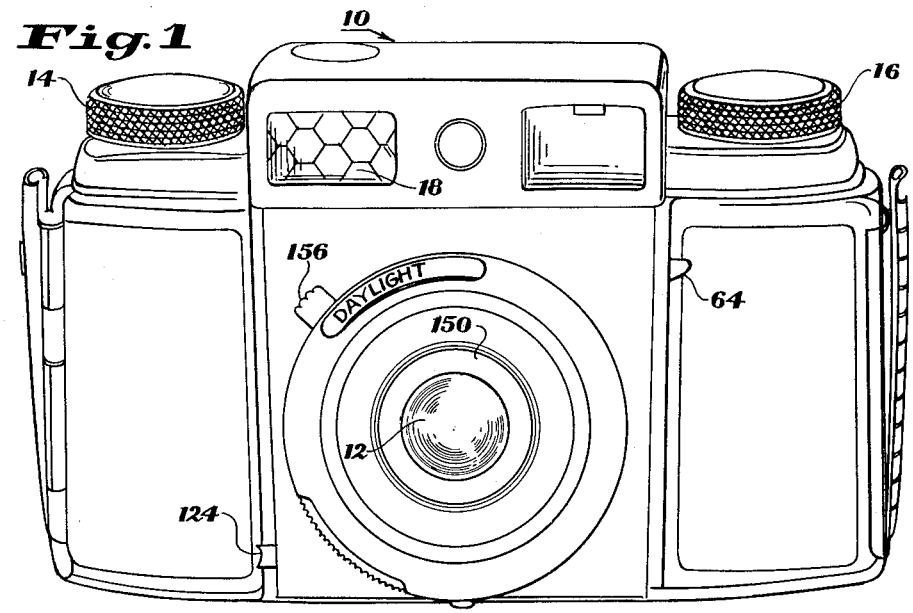
FIG. 1 is a front view of a camera embodying the invention.

Referring to FIG. 1, a camera 10 has an axial lens system, indicated generally at 12, for focussing an image of a viewed scene onto a photosensitive surface such as a roll film (not shown), which is wound by a pair of knobs 14 and 16. A light-measuring instrument mounted inside the camera has a light sensitive surface 20 (FIG. 2), which is exposed to the viewed scene through a lens block 18 (FIG. 1). Surface 20 is connected to the moving coil 22 (FIG. 2) of a galvanometer and energizes that galvanometer as a function of the intensity of the viewed light, causing coil 22 to rock about a pivot 23 and assume an angular position which is a function of the light intensity. The lens system, winding mechanism and light-measuring instrument are well known in the art and will not be disclosed in detail. It is understood, however, that various forms of these elements may be employed in the invention. For example, the light-measuring instrument may comprise a hot-wire actuator, a solenoid or any other photoelectric-to-mechanical transducer.

Referring to FIG. 3, the galvanometer coil 22 has an integral arm 24 that rocks with the coil. Arm 24 has a tip 26 formed at a right angle to the arm and extending through an arcuate slot 28 in a fixed plate 30. The tip 26 of the coil arm 24 cooperates with a serrated edge 32 of a first shutter-diaphragm blade 34, pivoted at 36. A second shutter-diaphragm blade 38 pivoted at 40, cooperates with blade 34 in overlapping relationship and the two blades normally cap a fixed aperture 42 that is concentric with the lens axis. During shutter operation blades 34 and 38 are pivoted in a reciprocal motion, first away from each other to form a diaphragm aperture 44 in alignment with the fixed aperture 42, then back to their rest positions for recapping aperture 42. The size of the diaphragm aperture 44 is determined by the position at which edge 32 on blade 34 engages the tip 26 of galvanometer arm 24 and is therefore a function of the light intensity. Slot 28 in plate 30 acts as an anvil for backing the galvanometer arm to prevent the application of undue stress to that arm.

The shutter may be of any type wherein a capping device, such as blades 34 and 38, is yieldably moved through a predetermined path to form an aperture. It may be necessary in some cases to modify the mechanism that drives the capping device, in order to provide a yieldable drive. The invention is illustrated in the accompanying drawings in conjunction with a well-known type of automatic single-speed shutter disclosed fully in Eastman Kodak Company Apparatus and Optical Division Parts List 5521 and commercially available in the Kodak Pony II Camera.

Briefly, this shutter comprises a trigger 46 (FIGS. 2 and 3) that is pivoted at 47 and is maintained in a clockwise position (as viewed in FIG. 2) by a drive spring 48. The latter spring yieldably secures the trigger to an impact lever 50, also pivoted at 47. The impact lever 50 has a shoulder 52 engaging an ear 54 on a latch 56, pivoted at 57. Lever 50 also has an end 74 engaging a first notch 76 in a flywheel 78, which is pivoted at 79. The impact lever 50 normally is maintained in a clockwise position (FIG. 2) by latch 56 and the latter normally is maintained in a counterclockwise position (FIG. 2) by a spring 58.

An ear 60 on trigger 46 is engaged by an arm 62 on the camera operating lever 64, which is pivoted at 66 and normally maintained in a clockwise position (FIG. 2) by a spring 68. When lever 64 is manually depressed to operate the camera, its arm 62 first rocks trigger 46 counterclockwise (FIG. 2) to increase the tension of the drive spring 48. Further depression of lever 64 rocks trigger 46 further counterclockwise until a shoulder 70 on the trigger engages an ear 72 on latch 56 and rocks the latch clockwise (FIG. 2), thereby disengaging shoulder 52 from ear 54. This releases the impact lever 50 for rapid counterclockwise movement (FIG. 2) under the tension of drive spring 48 for rotating the flywheel 78 clockwise (FIG. 2) against the tension of a spring 80. The flywheel is shown in its rotated position in FIGS. 3, 4 and 5, wherein that position is counterclockwise of the rest position. A second notch 82 in the flywheel is adapted to receive an arm 84 (FIG. 4) on a shutter-drive lever 86, which is pivoted at 88. When the flywheel is rotated away from its rest position it rocks the drive lever 86 clockwise (FIG. 4) until the inertia of the flywheel is expended in increasing the tension of spring 80, approximately at the position shown in FIG. 3. Spring 80 then returns flywheel 78 to its rest position, at which position the flywheel is stopped when arm 84 (FIG. 4) of the shutter-drive lever 86 re-enters notch 82 and returns lever 86 to its rest position (not shown). During this reciprocating motion of the shutter-drive lever, the latter imparts a reciprocating pivotal movement to the shutter-diaphragm blades 34 and 38 (FIG. 3) in the following manner.

The drive lever 86 comprises two members 90 and 92, both of which are pivoted at 88. Member 90 is integral with arm 84 and rocks through a full reciprocating stroke against the tension of a spring 94 when flywheel 78 is reciprocated as described above. Member 92 is yieldably secured to member 90 by a spring 96 and carries a pin 98, which engages respective slots 100 and 102 (FIG. 3) in blades 34 and 38. Slots 100 and 102 are arranged at an angle to each other and to the path of pin 98. Therefore, when the drive lever 86 (FIG. 4) is reciprocated, pin 98 on member 92 also reciprocates, first to pivot blades 34 and 38 (FIG. 3) away from each other until blade 34 is stopped by the tip 26 of galvanometer arm 24, then to pivot the blades back to their rest positions. Since blade 34 can be stopped at any differential position by the galvanometer arm, member 92 (FIG. 4) is stopped at some intermediate position in its cyclic stroke although member 90 continues to travel through its full cycle against the tension of springs 94 and 96.

*Low-light block and release*

When the intensity of light from the viewed scene or subject is too low to permit a normal exposure during automatic operation of the camera, it may be desirable to prevent manual actuation of the camera operating lever. For this purpose, a blocking lever 104 has a slot 106 by means of which it is mounted on the previously described pivot 57 for sliding and pivoting movement against the tension of a spring 108. A sensing lever 110 has a slot 112 adapted to receive a fixed pin 114 and is pivotally mounted at 116 on the blocking lever 104. A spring 118 normally maintains lever 104 in a clockwise position (as viewed in FIG. 3) where an ear 107 on lever 104 abuts the sensing lever 110. An ear 105 on blocking lever 104 underlies the previously described ear 60 on trigger 46. When the camera operating lever 64 (FIG. 2) is depressed, its arm 62 imparts a downward movement to trigger ear 60, blocking lever 104 and sensing lever 110.

Figure 2:
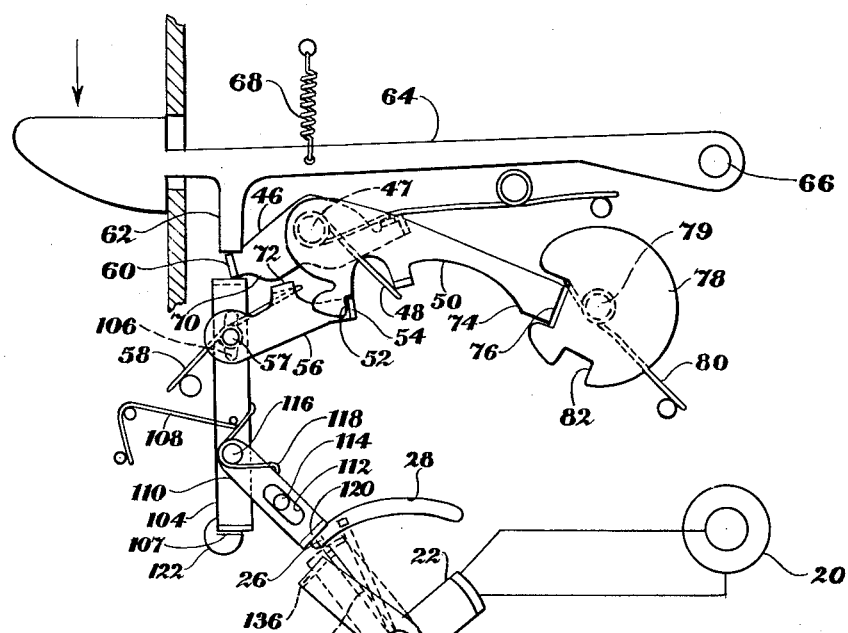
FIG. 2 is a rear view of the camera operating lever, showing its manner of cooperation with the shutter mechanism and the low-light block and low-light release mechanisms.

When there is sufficient light for a normal exposure, the galvanometer arm 24 is rocked away from its rest position, as shown in FIG. 3, and is out of the downward path of an ear 120 on the bottom of lever 110. In this case, ear 107 on lever 104 moves downward past a fixed stop 122. On the other hand, if the light is insufficient for a normal exposure, the galvanometer arm is at or near its rest position, as shown in FIG. 2, and is engaged by ear 120 on the sensing lever 110. The galvanometer arm then acts as a pivot and rocks the sensing lever 110 counterclockwise (as viewed in FIG. 2) about pin 114 against the tension of spring 118, thereby forcing pivot 116 and the blocking lever 104 to the left (FIG. 2), where ear 107 engages the fixed stop 122 to prevent further manual depression of the camera operating lever, thereby blocking the release of the shutter. The engagement of the blocking lever with stop 122 also prevents further manual pressure from being applied to the galvanometer arm.

If the person operating the camera wishes to make an exposure when there is insufficient light for automatic operation, he can momentarily disable the blocking mechanism described above. A release lever 124 (FIGS. 1 and 2) is supported for sliding motion by a pair of frame members 126 and 128 and normally is maintained in an outward position (shown in FIG. 2 by solid lines) by a spring 130. A crank 132 is pivotally connected to lever 124 at 134 and is mounted for rocking motion about pivot 23. An ear 136 on crank 132 is adapted for motion along the low-light end of the path of galvanometer arm 24 when lever 124 is moved inward to the position shown in broken lines in FIG. 2. If the galvanometer arm is in its low-light position at this time, crank ear 136 moves it out of the path of ear 120 on the sensing lever 110; therefore, blocking lever 104 cannot engage stop 122 and it is prevented from performing a blocking operation.

*Manual overrride*

In some instances, principally in photographing indoor subjects, it is known in advance that the intensity of light from the photographed subject is below the exposure range of the camera. In this case it is desirable to set the diaphragm value manually in accordance with the proper criteria for making a flash exposure. In other instances, too, it may be desirable to set the diaphragm value manually, for example in deliberately underexposing or overexposing, or in situations where the backlighting of the subject is in high contrast to the lighting of the subject itself.

Referring to FIGS. 3 and 5, a diaphragm-setting lever 140, pivoted at 23, has a first ear 142 that engages a cam slot 144 in a setting disk 146 (FIG. 6), which is concentric with the lens axis. Only the cam slot 144 of the setting disk is shown in FIGS. 3 and 5, where it is seen that a spring 148 urges lever 140 counterclockwise into a position where ear 142 engages the inner surface of the cam slot. Disk 146 (FIG. 6) has a central opening 147, by means of which it is freely mounted on a fixed sleeve hub 150 that is concentric with the lens axis, and has a knurled edge 174 to facilitate its manual turning. A selecting disk 152 is freely mounted on a smaller hub 151, integral and concentric with hub 150, for rocking movement about the lens axis.

The selecting disk 152 has a slot 154 aligned with slot 144 of the setting disk 146 for receiving ear 142 of the setting lever 140 (FIGS. 3 and 5). When the setting disk 146 is rocked about the lens axis in the manner hereinafter described, ear 142 of the setting lever follows the inner surface of cam slot 144. The cam slot has a narrow end 144a where its inner surface is substantially an arc of a circle concentric with the lens axis, and has a wider end 144b where its inner surface spirals toward the lens axis. When disk 146 is in a counterclockwise positon (FIG. 3), ear 142 of the setting lever 140 lies in the narrow end 144a of the cam slot and maintains the setting lever in its clockwise position where a second ear 143 lies outside the arcuate path of the galvanometer arm 24 and permits free automatic operation of the galvanometer and diaphragm. On the other hand, when disk 146 is in its clockwise position (FIG. 5), ear 142 lies in the wider end 144b of the cam slot and permits spring 148 to rock the setting lever 140 counterclockwise, thereby permitting ear 143 to rock galvanometer arm 24 counterclockwise for manually determining the maximum opening of blades 34 and 38.

The selecting lever 152 (FIG. 6) has an arm 156 (see also FIG. 1) by means of which it may be rocked manually between two extreme angular positions, in each of which it is yieldably retained in a respective detent 158 and 160 (shown schematically) in the camera front. A leaf spring 162 is secured to setting disk 146 by a rivet 164 extending through a hole 166 in the setting disk. Spring 162 has a free end 168 that is formed to extend through a slot 170 in disk 146 and into engagement with a series of arcuately spaced detenting apertures 172 in the selecting disk 152. When the selecting disk is rocked about the lens axis, by means of arm 156, it carries the setting disk 146 with it by the frictional engagement of spring end 168 with one of the apertures 172. However, detents 158 and 160 have substantially greater frictional resistance than does the detenting spring 168 in apertures 172; therefore, the setting disk 146 may be rocked about the lens axis independently of the selecting disk 152.

A disk 176 has a central opening 178 by means of which it is freely mounted on hub 151 for rocking movement about the lens axis. Disk 176 is secured to and moves with the selecting disk 152 by means of a rivet 180 that extends through an arcuate slot 182 in disk 146 and through a hole 184 in disk 152. Disk 176 carries a setting window 186, which is moved either to a viewing position, shown in solid lines, or to a nonviewing position, shown in broken lines. When the setting window 186 is in its viewing position (selecting disk 152 is in its clockwise positon as viewed in FIG. 6), it overlies a scale 188 on setting disk 146 and underlies a selecting window 190 on a fixed cover 192. Scale 188 may be graduated in aperture values or EV values (as shown) or in any other convenient exposure designations. When setting window 186 is in its nonviewing position, it is no longer in register with selecting window 190 in the cover disk 192; therefore, scale 188 is not visible from the outside of the camera. Disk 192 has an arcuate recess 194 through which the knurled edge 174 of setting disk 146 is exposed for manual adjustment of the diaphragm.

Figure 6:
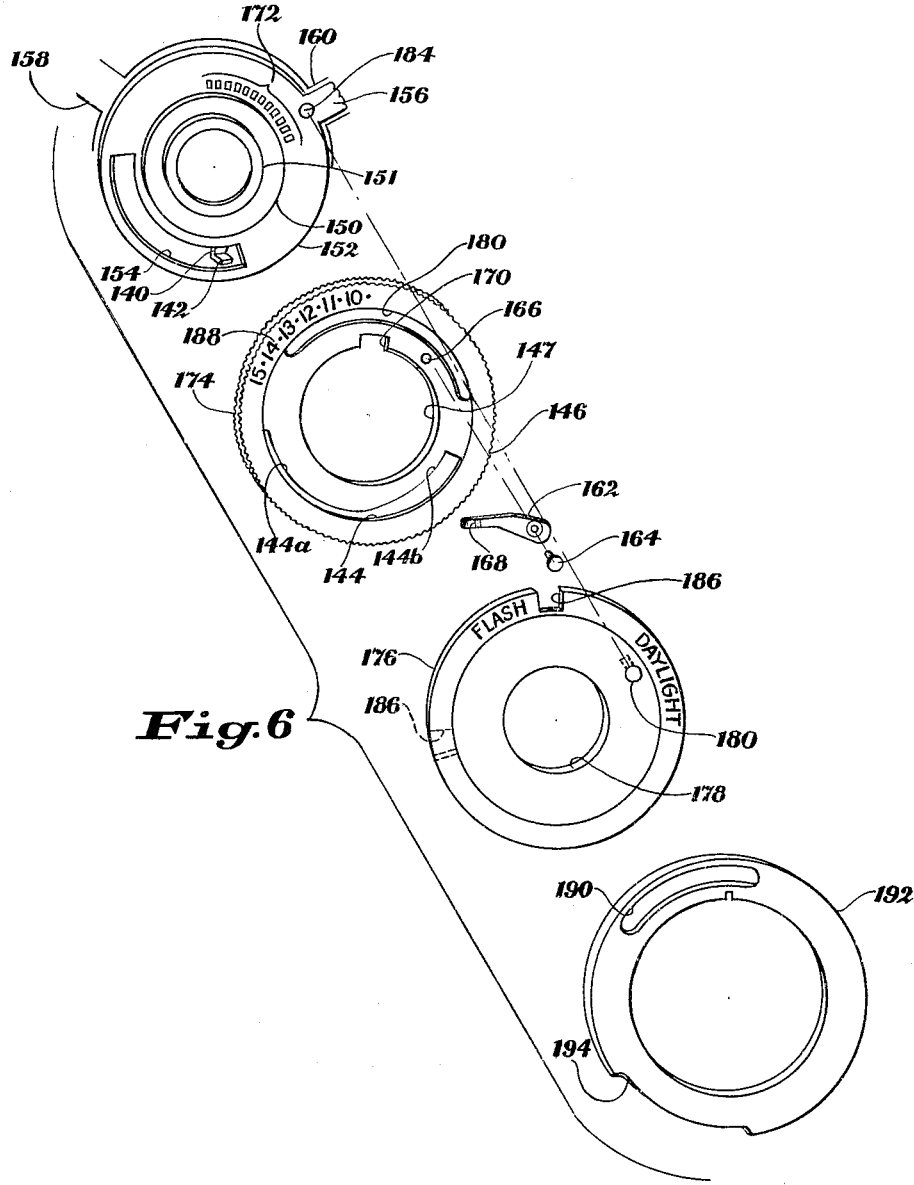
FIG. 6 is an exploded isometric view of the manual override control mechanism.
Figure 7:
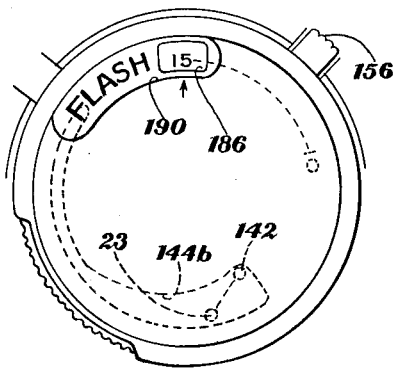
FIGS. 7–10 are schematic drawings of the manual override mechanism in various positions of operation.
Figure 8:
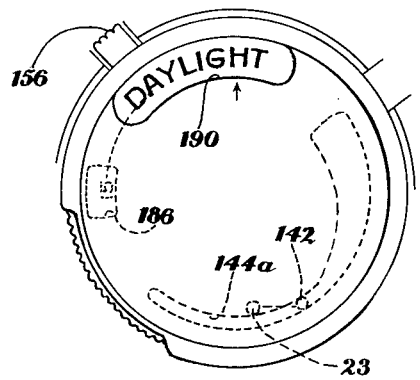
Figure 9:
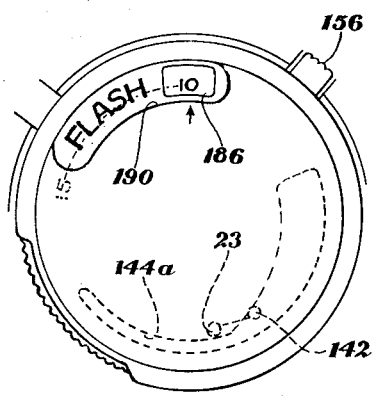
Figure 10:
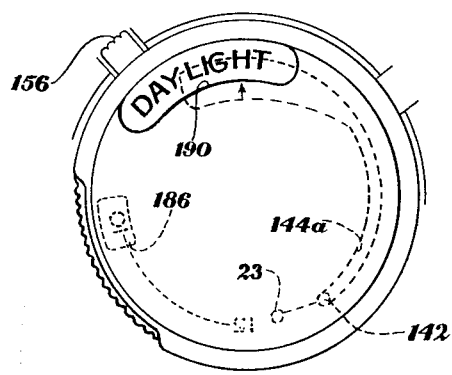

The two positions of selecting disk 152 may be indicated by lettering, such as "Flash" and "Daylight" (or "Manual" and "Automatic,") on the peripheral face of disk 176. When selecting disk 152 is in its clockwise position, as shown in FIG. 6, window 186 and the word "Flash" (or "Manual") on disk 176 are visible through the selecting window 190 in disk 192; therefore, the person operating the camera knows that he must set the exposure value manually as indicated in window 186. When the selecting disk 152 is in its counterclockwise position, only the word "Daylight" (or "Automatic") on disk 176 is visible through the selecting window 190, and since no exposure numbers are visible in that window the operator knows that the camera is operated automatically at this time.

FIGS. 7–10 illustrate the relationship of the various elements of the manual override system. The setting lever 140 is indicated schematically, its pivot 23 and its cam following ear 142 being shown as connected circles. From FIGS. 7–10 it will be seen that when the selecting disk 152 is in its clockwise (Flash or Manual) position, the setting-lever ear 142 is in some portion of the wide end 144b of the cam slot, depending upon the manually set position of disk 146. It will also be seen that when selecting disk 152 is in its counterclockwise (Daylight or Automatic) position, ear 142 of the setting lever is in the narrow end 144a of the cam slot, regardless of the manually set position of disk 146. Therefore, when the camera is set for automatic operation, it is impossible for the operator to accidentally control the diaphragm opening by any manual setting of disk 146.

The invention has been described in detail with particular reference to preferred embodiments thereof, but it will be understood that variations and modifications can be effected within the spirit and scope of the invention as described hereinabove and as defined in the appended claims.

We claim:

1. In a camera having a lens system for focusing an image of a viewed scene onto a photosensitive surface, the combination comprising: a shutter mechanism including a capping device normally interposed between said scene and said surface in alignment with said lens system for completely blocking said image from said surface and adapted, in response to triggering said shutter mechanism, for temporarily moving said capping device away from its position of alignment with said lens system for a preselected exposure time to establish an effective exposure aperture; manually operable means for triggering said shutter mechanism; a light-measuring instrument adapted for energization by scene light and having a member differentially positioned as a function of scene brightness, said member being disposed in cooperative relation with said capping device for limiting the movement of said capping device away from its position of alignment with said lens system to determine the size of said aperture as a function of scene brightness; and means interrelating said differentially positioned member and said shutter triggering means for blocking manual operation of the latter when said differentially positioned member is in a predetermined position.

2. The combination defined in claim 1, wherein said blocking means comprises: a first lever adapted for movement in response to operation of said shutter triggering means; a second lever pivoted to said first lever and adapted, in response to movement of said first lever, to engage said differentially positioned member when the latter is in said predetermined position; a fixed stop; means for normally guiding said first lever in a first path, clear of said fixed stop, during movement of said first lever; and means controlled by said second lever, when said differentially positioned member is in said predetermined position, for guiding said first lever in a second path to engage said fixed stop during movement of said first lever.

3. The combination defined in claim 1, with: manually operable means disposed in cooperative relation with said differentially positioned member for selectively rendering said blocking means ineffective.

4. The combination defined in claim 1, with: manually operable override means disposed in cooperative relation with said differentially positioned member for manually moving said member to a position corresponding to a light intensity greater than that of the viewed scene.

5. The combination defined in claim 4, with: selecting means engaging a part of said override means; and means connected to said selecting means for manually adjusting the latter to either of two operating positions for respectively enabling and disabling said override means.

6. In a camera having a lens system for focusing an image of a viewed scene onto a photosensitive surface, the combination comprising: a shutter mechanism including a capping device including at least one pivotally movable blade normally interposed between said scene and said surface in alignment with said lens system for completely blocking said image from said surface and adapted, in response to triggering said shutter mechanism for temporarily pivoting said blade away from its position of alignment with said lens system for a preselected exposure time to establish an effective exposure aperture; manually operable means for triggering said shutter mechanism; and a light-measuring instrument adapted for energization by scene light and having a member differentially positioned as a function of scene brightness for intercepting said blade during operation of said shutter mechanism, to limit the movement of said blade and thereby limit the size of said aperture as a function of scene brightness.

References Cited in the file of this patent

UNITED STATES PATENTS

| | | |
|---|---|---|
| 761,756 | Brueck | June 7, 1904 |
| 2,061,909 | Karg | Nov. 24, 1936 |
| 2,297,262 | Tonnies | Sept. 29, 1942 |
| 2,305,294 | Kuppenbender | Dec. 15, 1942 |
| 2,418,370 | Simmon | Apr. 1, 1947 |
| 2,841,061 | Bagby et al. | July 1, 1958 |
| 2,887,025 | Rentschler | May 19, 1959 |
| 2,906,166 | Herterich | Sept. 29, 1959 |
| 2,913,972 | Cade | May 24, 1959 |